& Naughton

United States Patent [19]

Shuttleworth

[11] 4,053,039
[45] Oct. 11, 1977

[54] CONVEYOR SUPPORT

[75] Inventor: Howard P. Shuttleworth, Warren, Ind.

[73] Assignee: Shuttleworth Inc., Huntington, Ind.

[21] Appl. No.: 669,509

[22] Filed: Mar. 23, 1976

[51] Int. Cl.² ........................................ B65G 13/00
[52] U.S. Cl. ................................... 193/35 R; 198/780
[58] Field of Search ............... 193/35 R, 37; 198/780

[56] References Cited

U.S. PATENT DOCUMENTS

| 2,563,965 | 8/1951 | Seed | 193/35 R |
| 2,600,747 | 6/1952 | Faust | 193/35 R |
| 3,840,102 | 10/1974 | Dawson | 193/35 R |

FOREIGN PATENT DOCUMENTS

| 1,129,259 | 10/1968 | United Kingdom | 193/35 R |
| 1,389,185 | 4/1975 | United Kingdom | 193/35 R |

Primary Examiner—Evon C. Blunk
Assistant Examiner—Jeffrey V. Nase
Attorney, Agent, or Firm—Woodard, Weikart, Emhardt & Naughton

[57] ABSTRACT

A support for a conveyor shaft having a plurality of rollers mounted thereon. The support snaps onto the shaft between two of the rollers. The support projects downwardly below the rollers, and is spaced above a support surface. Excessive weight on the shaft will cause the shaft to bow or bend downwardly and the support will then engage the support surface to resist further bowing of the shaft. The support extends perpendicularly to the shaft to support similarly a plurality of shafts.

10 Claims, 6 Drawing Figures

CONVEYOR SUPPORT

BACKGROUND OF THE INVENTION

1. Field of the Invention

This invention is in the field of supports for conveying devices.

2. Description of the Prior Art

Conveyors are employed in various fields to transport objects along a pathway or over a distance. These conveyors typically comprise one of two types, the belt conveyor and the roller conveyor. In the first type, the conveyor includes a continuous belt which extends over rotatable rollers. The rollers are driven by a motor to move the belt and to transport the objects which are supported thereon. The second type of conveyor incorporates rollers which are rotatably mounted on a shaft, the transported objects resting directly upon the rollers. The rollers either depend upon the force of gravity acting on the objects to move the objects down the conveyor line, or the rollers are positively driven by a motor.

A conveyor may be required to support a substantial amount of weight. This may be true, for example, for a conveyor which is used in conjunction with a case-packing machine. In that instance, the conveyor will simultaneously transport a large number of filled containers. A conveyor may also be required to have substantial load capacity if the single items transported thereon are heavy, as when heavy objects or filled boxes are moved by a conveyor.

The rotatable rollers used in both types of conveyors will typically be supported by a shaft which extends through the center of the rollers, perpendicularly to the path along which the objects are moved. Thus, the weight of the objects in a given section of a conveyor will be supported by a limited number of these shafts. The amount of weight supported by any one shaft will depend upon the spacing between the adjacent shafts, and the length of the shaft (the width of the conveyor).

The support requirements place certain practical limits on the usefulness of some conveyor systems. Many of the continuous belt and rotatable roller conveyors employ rollers which are one piece and span the full width of the conveyor. Roller conveyors having full-width rollers are disclosed, for example, in U.S. Pat. Nos. 3,610,406; 3,627,092; and 3,650,375, each issued to Fleischauer et al. The fact that each roller extends the entire width of the conveyor line precludes the possibility of supporting the roller intermediate of its supported ends. This point is made clear in the first two cited patents, in which contact with the rollers intermediate of the supported ends is used as a means to prevent rotation of the rollers and therefore to restrict movement of objects along the top of the rollers. In U.S. Pat. No. 3,610,406, for example, a pivoted linkage is positioned beneath the rollers, one end of the linkage being secured to a sensing roller assembly. Downward displacement of the sensing roller assembly, and therefore of the connected end of the pivoted linkage, results in upward movement of a brake block located at the opposite end of the pivoted linkage. This upward movement causes the brake block to engage some of the other rollers and to stop their rotation. Similarly, U.S. Pat. No. 3,627,092 discloses a braking mechanism which operates by causing a flexible band to frictionally engage the surface of the rotatable rollers to prevent movement thereof.

As indicated, rollers which extend the full width of the conveyor are not supportable intermediate of the ends thereof. As a result, the amount of weight that may be carried by a conveyor of this type is limited. To enable the conveyor to carry a substantial weight, only the size and strength of materials which are employed in the shafts or rollers may be varied for a given conveyor width. In turn, the systems designed for carrying greater amounts of weight will generally require substantially greater amounts of material and expense. Also, there are practical limits on the size and strength of materials which may be used since the rotation of these elements becomes increasingly difficult with the greater sizes. In particular, those which are motor driven will require substantially greater amounts of power, and will be less efficient.

Multiple-roller conveyors utilize a plurality of rollers mounted upon each shaft between the supported ends of the shaft. Intermediate support is even more important for multiple-roller conveyors, since the conveyor does not have the strength of the unitary roller to add to the strength of the shaft. In other words, the rollers in this type of conveyor do not contribute as significantly to the load capacity of the conveyor. The primary control over the support strength is to alter the length and strength of the shafts. As a result, the need has arisen to provide means for supporting the shaft of this type of conveyor intermediate of the supported ends of the shaft.

In U.S. Pat. No. 2,897,953, issued to Namenyi-Katz on Aug. 4, 1959, there is disclosed a conveyor system which utilizes several parallel, co-planar shafts, each shaft having a plurality of cylindrical rollers mounted thereon. The cylindrical rollers are mounted in side-by-side relation and are mechanically driven by pressurized gas acting upon internal vanes of the rollers. U.S. Pat. No. 3,337,023, issued to Kohl et al., on Aug. 22, 1967, discloses a conveyor system which similarly has a plurality of rollers mounted upon each of several shafts. In neither of these patents, however, is there disclosed a means for supporting the shafts intermediate of the normally-supported ends of the shaft, without obstructing the path of objects travelling along the tops of the rollers.

In my U.S. patent application, Ser. No. 467,090, now issued as U.S. Pat. No. 3,951,255, there is disclosed another conveyor having a plurality of rollers on each shaft. The present invention may be used with this and other multiple-roller conveyors to provide increased load capacity for the conveyor.

SUMMARY OF THE INVENTION

In a conveyor for moving objects, the conveyor including a shaft supported at first and second locations on the shaft, a plurality of rollers mounted on the shaft between the first and second locations in side-by-side relation, the rollers projecting upwardly from the shaft and being unobstructed to define a discontinuous surface area extending other than vertically between the first and second locations, the objects being held against the discontinuous surface area by gravity, the improvement comprising support means for supporting the shaft intermediate of the first and second locations, the support means including a support member connected to the shaft between two of the plurality of rollers, the support member extending upwardly less than the rollers mounted on the shaft.

It is an object of the present invention to provide a support for a multiple-roller conveyor to increase the load capacity of the conveyor.

Another object of the present invention is to provide a conveyor which has the advantages attendant to having a plurality of rollers mounted on a shaft, and yet is also capable of supporting a substantial amount of weight.

Another object of the present invention is to provide a support for a multiple-roller conveyor which is easily installed onto or removed from the conveyor and is readily adaptable to various conveyor sizes and configurations.

A further object of the present invention is to provide a support which increases the load capacity of a multiple-roller conveyor, and which is simple and inexpensive to manufacture.

It is a further object of the present invention to provide a conveyor support which does not significantly interfere with the operation of the conveyor.

Further objects and advantages of the present invention will become apparent from the following drawings and description of the preferred embodiment.

DESCRIPTION OF THE PREFERRED EMBODIMENT

Figure 1:
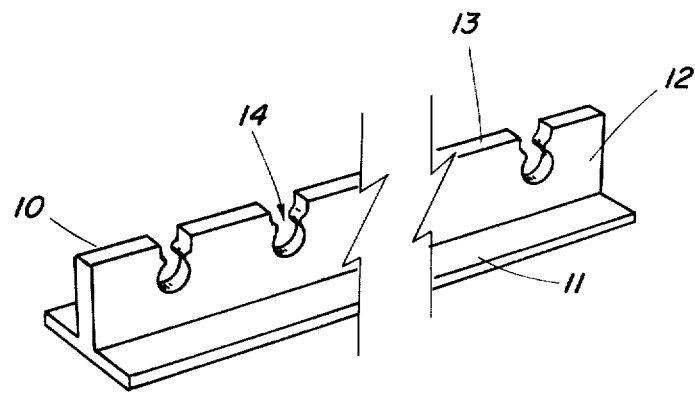
FIG. 1 is a perspective view of the support member of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The conveyor support of the present invention is particularly applicable to and useful with a number of conveyor system designs. The primary requirement is that the conveyor for which the present conveyor support is to be used must include a shaft which has a plurality of rollers attached to and extending above the shaft. It is not important whether the objects moved along the conveyor rest directly upon the rollers, or upon a continuous belt which is driven by the rollers. Nor does it matter whether the shaft upon which the rollers are mounted is stationary or rotatable. For the purposes of description, reference will be made to the operation of the present conveyor support in conjunction with a particular conveyor system. This conveyor system is fully described in U.S. patent application, Ser. No. 467,090, now issued as U.S. Pat. No. 3,951,255, and the disclosure contained therein is hereby incorporated by reference. Although the new structure disclosed and shown in this specification is incorporated onto the particular conveyor system, it is to be understood that the present invention is not necessarily associated with nor limited to that conveyor system.

Figure 2:
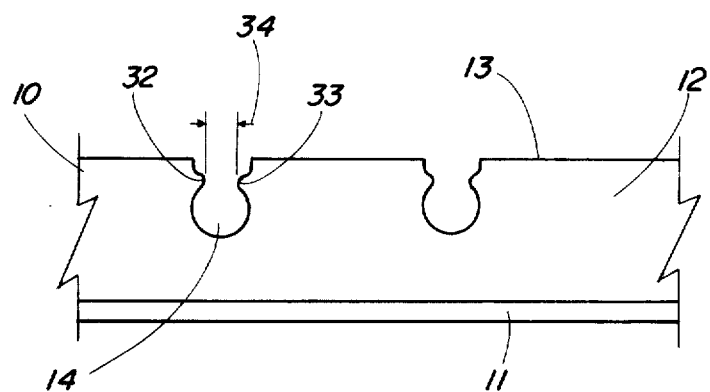
FIG. 2 is a side plan view of the support member of FIG. 1.

Referring in particular to FIGS. 1 and 2, there is shown support member 10 which is utilized by the present invention. Support member 10 includes a base 11 and an upright 12. The upright 12 includes a top edge 13 and defines partial enclosures, such as 14.

Figure 5:
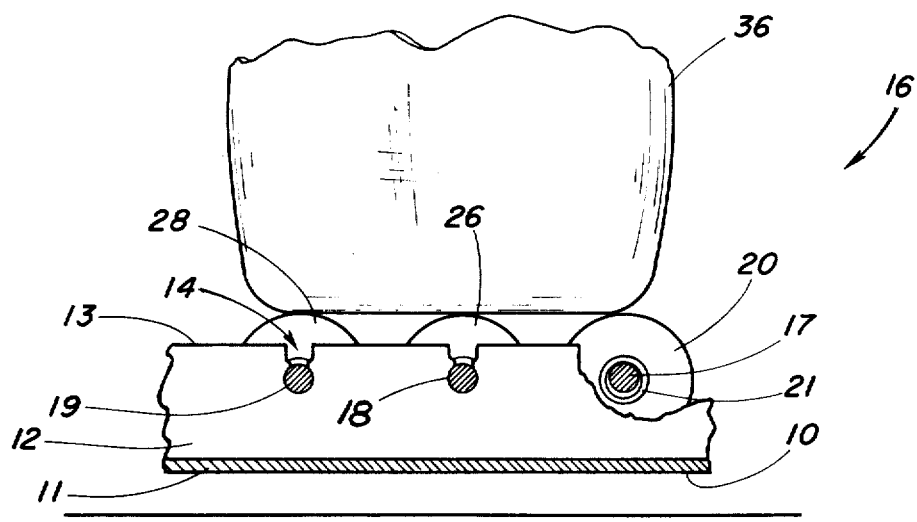
FIG. 5 is a side view of the conveyor of FIG. 4 taken along the lines 5—5 and showing a portion of the support member broken away.
Figure 6:
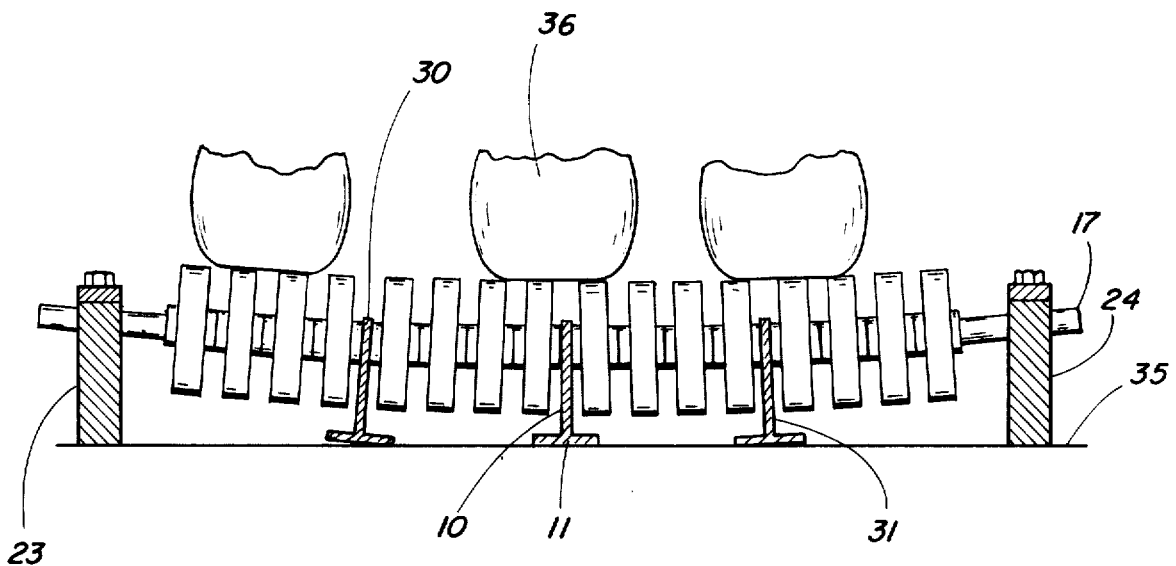
FIG. 6 is the same view as FIG. 4 except showing the operation of the support member when the conveyor shaft is caused to bend.

Support member 10 is attached to conveyor 16 which comprises parallel shafts 17–19. Mounted on each of the shafts are a plurality of rotatable rollers, such as 20. The tops of the rollers define a discontinuous surface area upon which the transported objects, such as 36, rest. Roller 20 includes spacers 21 and 22. The spacers are provided to separate adjacent rollers and to cause contact therebetween to occur over a limited surface area, and thereby to reduce interference with the separate movement of the various rollers. The inside diameter of the cylindrical rollers is made larger than the outside diameter of the corresponding, cylindrical shaft, thereby permitting the rollers to slip with respect to the shaft in the event that the rollers become jammed. Thus, the inside diameter of roller 20 is slightly larger than the outside diameter of shaft 17 (FIG. 5).

Figure 3:
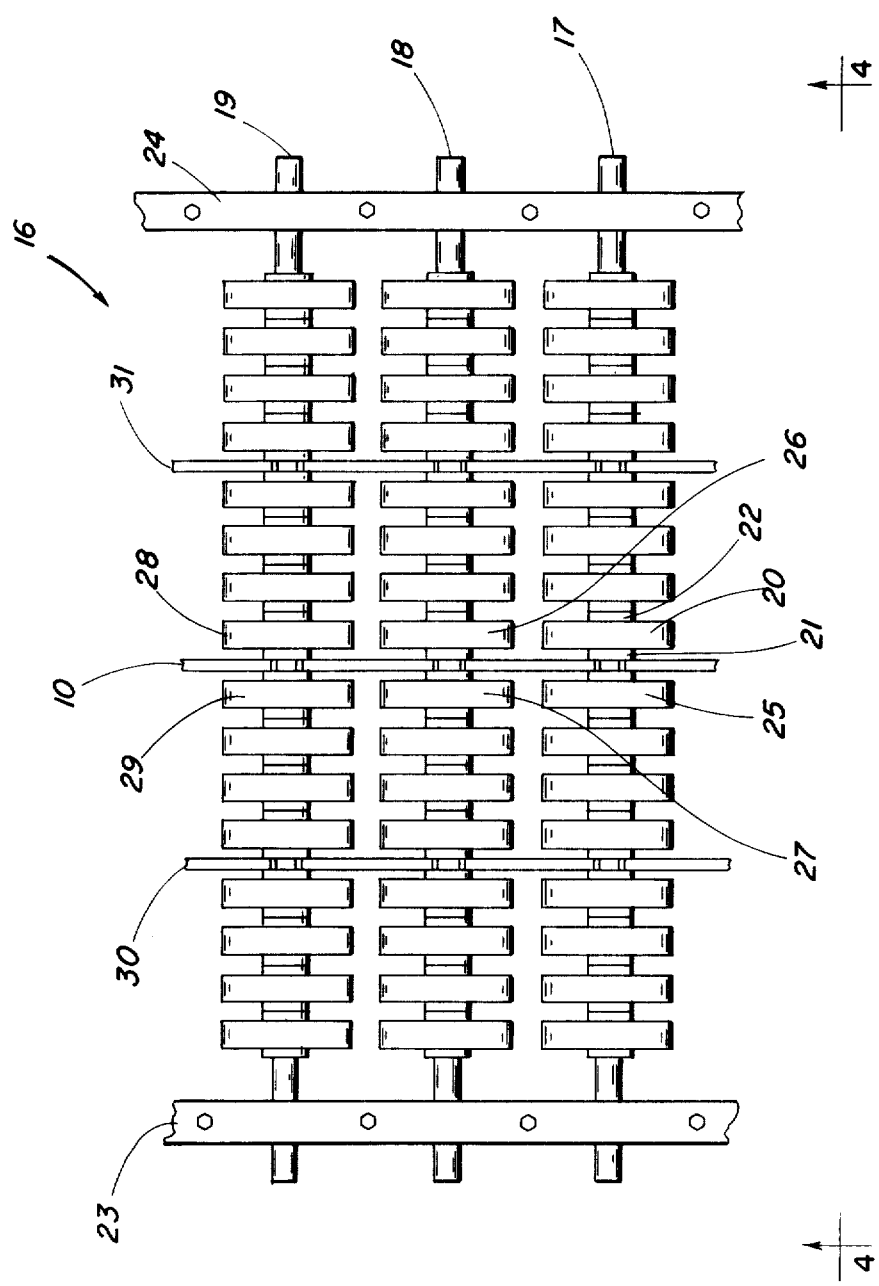
FIG. 3 is a top view of a portion of a multiple-roller conveyor in which the support member of FIG. 1 has been installed.

Each of the shafts 17–19 is supported near its ends by support blocks 23 and 24. Support member 10 is connected to the shafts intermediate of the support blocks 23 and 24 and between two of the rollers on each of the shafts. Support member 10 (FIG. 3) is connected to shaft 17 between rollers 20 and 25, to shaft 18 between rollers 26 and 27, and to shaft 19 between rollers 28 and 29. The top edge 13 of support member 10 is located below the tops of the rollers to avoid interference with the movement of objects over the rollers.

Support member 10 is attached to shafts 17–19 by receiving the shafts within partial enclosures, such as 14 (FIG. 2). Shaft 19, for example, is received within partial enclosure 14 (FIG. 5), and shafts 17 and 18 are received within identical, appropriately-located partial enclosures defined by upright 12. Detents 32 and 33 are located near the opened end of partial enclosure 14, causing the opening 34 (FIG. 2) to be narrower than the diameter of cylindrical shaft 19. As a result, when shaft 19 is positioned within the partial enclosure 14, interior of the detents 32 and 33, the shaft 19 is retained therein by the detents. Support member 10 is formed from a resilient material to permit partial enclosure 14 to be forced over the shaft 19, momentarily increasing the distance between detents 32 and 33 to permit passage of the shaft 19 therethrough. When shaft 19 is interior of detents 32 and 33, opening 34 regains its normal size and shaft 19 is thereby retained within partial enclosure 14. The purpose of the described design of the partial enclosure, such as 14, is to permit support member 10 to be forced or snapped onto the shaft for which it will provide the additional support. The support member may similarly be removed from the respective shafts in the reverse manner. The other partial enclosures of support member 10 are identical to partial enclosure 14 and operate in the same fashion.

The shafts 17–19 are depicted as having circular cross-sections, and the partial enclosures such as 14 are shown to be complementary-shaped. The size and shape of the shaft, however, may vary from the circular cross-section shown. A portion of the partial enclosures interior of the detents is then correspondingly varied to have a size and shape which will permit the shaft to be received and retained. It may also be desirable to vary the configuration of the interior of the partial enclosures depending on whether or not the received shafts are rotatable. If the shafts are rotatable, the circular interior is preferred to minimize interference with the rotational movement of the shafts. On the other hand, in certain situations, it may be preferred to have a non-circular opening for receiving a rotatable, cylindrical shaft, in order to minimize the areas of contact between the shaft and the partial enclosure. The opening should, in any event, be slightly larger than the shaft, if the shaft is rotated.

This construction is one of the known methods for releasably connecting two members. Other known methods for releasably connecting two members are contemplated by and fall within the purvue of the present invention. The disclosed structure is preferred, however, because it permits a rapid "snap-on" releasable connection of the support member to the shaft, while enabling the support member to be easily and inexpensively manufactured. By proper sizing of the partial enclosures and detents, the support members are easily attached to or removed from the shaft. In particular, the preferred structure described herein permits the support member to be readily adapted to existing conveyors, without the need to make any modifications or to dismantle the conveyors. Also, the present design is readily adaptable to conveyors having shafts of various sizes and spacings. An inexpensive plastic material may be used to construct the support member of the present invention and will provide sufficient support strength, while being resilient enough to permit this method of attachment.

Support member 10 is shown attached to several parallel shafts. The present invention, however, also contemplates that the support member may be connected to only one shaft, or to a larger number of shafts. It is preferable that the support member be connected to several shafts since the attachment and removal of the support member is easily performed for a large number of shafts. Also, it would be expected that each, if any, of the shafts would require the additional support, and attachment of one support member to several shafts may be accomplished more quickly than attaching individual support members to each of the shafts. To accommodate attachment to a large number of shafts, the support member 10 is simply made the appropriate, corresponding length, and the partial enclosures are positioned accordingly. If the shafts of the conveyor are not arranged in a parallel manner, then the number of shafts which any one support member may be practically attached to will decrease. The support member may, however, be formed in such a configuration as to be attachable to essentially any arrangement of shafts. Where this is not practical, individual support members may be connected to each shaft.

Figure 4:
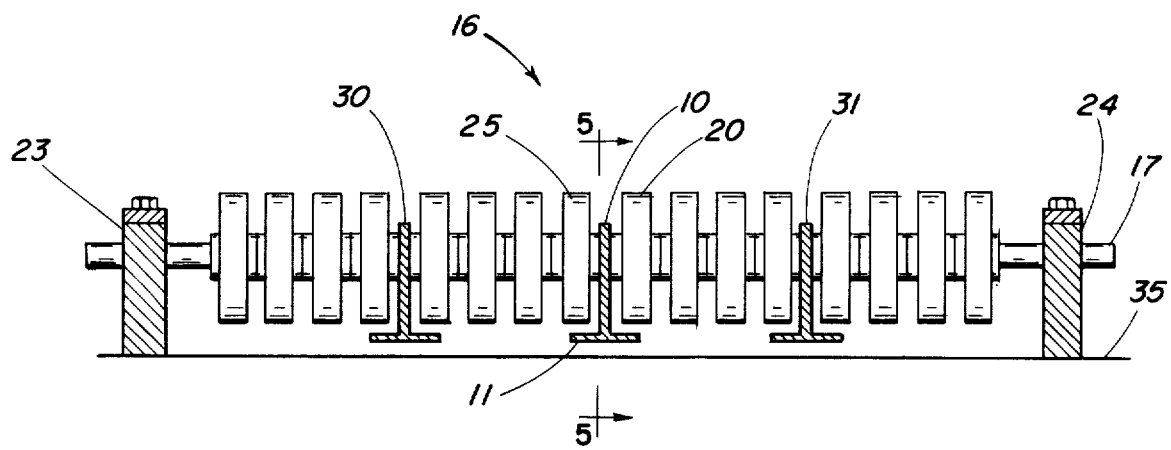
FIG. 4 is an end view of the conveyor of FIG. 3 taken along the lines 4—4.

The support members which are attached to the shafts operate in conjunction with a surface preferably located directly beneath the support members and the shafts. The base 11 of support member 10 is normally spaced apart from the support surface 35 (FIG. 4) when shaft 17 is not supporting any transported objects. When the moving objects are resting upon shaft 17, or any of the other shafts, the weight of the objects will cause shaft 17 to bend downwardly. When a sufficient weight is resting upon shaft 17, it will bend downwardly until the base 11 of support member 10 contacts the support surface 35. The support member 10 will then resist any further bending of shaft 17. Because support member 10 extends downwardly below the bottom of the rollers, the contact with the support surface will occur exclusively at the base of the support member. As a result, the limit to the bending of shaft 17 is reached prior to contact of the rollers with the support surface.

In the absence of support member 10, the shaft would continue to bend downwardly. The rollers could then come in contact with the support surface and stop turning. The shaft 17 also could simply deform or break under the weight of the moving objects, thereby arresting the movement of the objects. In these or other instances, the presence of an excessive load on a particular shaft would result in significant interference with the operation of the conveyor in the absence of the support members.

The support member 10 includes a base 11. This base provides a wider area of contact with support surface 35 than would exist with only upright 12. This prevents support member 10 from turning sideways as the shafts bend downwardly, and thereby insures that the support member will resist further bending of the shafts upon contact of the support member with the support surface. Similarly, connection of the support member to more than one shaft insures that the support member will not rotate about a single shaft sufficiently to avoid proper contact with the support surface upon bending of the shaft.

In addition to support member 10, support members 30 and 31 are also positioned along shaft 17 (FIG. 4), and other shafts. Support members 30 and 31 are identical to support member 10 and operate in the same manner. When shaft 17 bends under the weight of the supported objects, the lowest portion of the shaft will generally be the center, the point farthest from the two supported ends. However, depending on the length and strength of shaft 17, as well as the distribution of the supported weight, bending may additionally occur at points other than the center. For this reason, it may be preferable to include the additional support members 30 and 31, as well as any additional number of support members, to provide support at points other than the center of the shaft.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are described to be protected.

The invention claimed is:

1. In a conveyor for moving objects, the conveyor including a shaft supported at first and second locations on said shaft, a plurality of rollers mounted on said shaft between said first and second locations in side-by-side relation, said rollers projecting upwardly from said shaft and being unobstructed to define a discontinuous surface area extending other than vertically between said first and second locations, said objects being held against said discontinuous surface area by gravity, the improvement comprising:

support means for supporting said shaft intermediate of said first and second locations, said support means including a support member having an upright connected to said shaft between two of said plurality of rollers, said support member extending upwardly less than said rollers mounted on said shaft; and connecting means for releasably connecting said support member to said shaft while said rollers remain on said shaft, said connecting means including a slot defined by said upright within which said shaft is received, said connecting means further comprising a surface positionable against the top of said shaft when said shaft is received within the slot to support said support member upon said shaft;

said support means further comprising a support surface spaced-apart from said support member and positioned to prevent downward displacement of said support member beyond a preselected distance, said support member having a base surface extending outwardly from the upright and positioned to engage said support surface upon downward displacement of said support member the preselected distance, the base surface of said support member being of sufficient area to provide stability upon engagement with said support surface, whereby said base surface engages said support surface when the shaft of the conveyor bends downwardly due to the weight of objects being supported upon the rollers mounted on the shaft, said support member thereby supporting said shaft and said objects and preventing further bending of said shaft.

2. The improvement of claim 1 in which said support member includes a horizontally-extending flange portion, the flange portion defining the base surface of said support member.

3. The improvement of claim 1 in which said support member has an inverted T-shape cross section.

4. The improvement of claim 1 in which the slot defined by said upright is a partial enclosure having an opening which is narrower than the shortest lateral dimension of the cross section of the shaft at the location at which said support member is connected thereto.

5. The improvement of claim 4 in which said support member has an inverted T-shape cross section.

6. The improvement of claim 1 in which said support surface is positioned vertically beneath said support member and said shaft.

7. The improvement of claim 1 in which said conveyor includes a plurality of shafts, each shaft being supported at first and second locations on said shafts, a plurality of rollers being associated with and mounted on each of said shafts between said first and second locations in side-by-side relation, said rollers projecting upwardly from the associated shaft and being unobstructed to define a discontinuous surface area extending other than vertically between said first and second locations and between said plurality of shafts, said objects being held against said discontinuous surface area by gravity, said support means including a support member associated with and connected to each of said plurality of shafts between two of said plurality of rollers mounted on the associated shaft, said support member extending between adjacent shafts and being located below the planar surface area defined by the tops of said two rollers mounted on one of said adjacent shafts and the top of one of said two rollers mounted on the other of said adjacent shafts, said connecting means being for releasably connecting said support member to at least one of the plurality of shafts while said rollers remain on said shaft.

8. The improvement of claim 7 in which said support surface is positioned vertically beneath said support member and the plurality of shafts.

9. The improvement of claim 7 in which said connecting means comprises a plurality of slots defined by said support member, each of said plurality of shafts being received within and held by an associated slot, each of the slots being a partial enclosure having an opening which is narrower than the shortest lateral dimension of the cross section of the associated shaft at the location at which said support member is connected thereto.

10. The improvement of claim 9 in which said support member has an inverted T-shape cross section.

* * * * *